United States Patent
Sugihara

(10) Patent No.: US 10,265,888 B2
(45) Date of Patent: Apr. 23, 2019

(54) MOLD AND METHOD OF PRODUCING MOLDED ARTICLE USING THE MOLD

(71) Applicant: BRIDGESTONE CORPORATION, Chuo-ku, Tokyo (JP)

(72) Inventor: Shingo Sugihara, Hiratsuka (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 195 days.

(21) Appl. No.: 15/304,583

(22) PCT Filed: May 12, 2015

(86) PCT No.: PCT/JP2015/002403
§ 371 (c)(1),
(2) Date: Oct. 17, 2016

(87) PCT Pub. No.: WO2015/174076
PCT Pub. Date: Nov. 19, 2015

(65) Prior Publication Data
US 2017/0080605 A1    Mar. 23, 2017

(30) Foreign Application Priority Data
May 16, 2014 (JP) .................................. 2014-102303

(51) Int. Cl.
*B29C 33/22*    (2006.01)
*B29C 45/33*    (2006.01)
(Continued)

(52) U.S. Cl.
CPC ............ *B29C 33/48* (2013.01); *B29C 33/202* (2013.01); *B29C 45/2602* (2013.01);
(Continued)

(58) Field of Classification Search
CPC ....... B29C 45/33; B29C 33/202; B29C 67/246; B29D 30/0629
See application file for complete search history.

(56) References Cited

U.S. PATENT DOCUMENTS 1,390,058 A * 9/1921 Parker ................ B29D 30/0629
425/39
3,082,480 A * 3/1963 Balle .................. B29D 30/0629
425/46
(Continued)

FOREIGN PATENT DOCUMENTS

DE        2104648 A1 * 8/1972 ............. B29C 33/48
JP        59052631 A * 3/1984 ............. B29C 45/26
(Continued)

OTHER PUBLICATIONS

Machine translation of Japanese Patent Publication No. JP-59052631A, originally published Mar. 27, 1984, 4 pages (Year: 1984).*
(Continued)

*Primary Examiner* — William P Bell
(74) *Attorney, Agent, or Firm* — Kenja IP Law PC

(57) ABSTRACT

Provided are a mold allowing smooth removal of a molded article therefrom without deforming the molded article, and a method of producing the molded article using the mold. The mold includes a first mold piece (A), a second mold piece (B), and a plurality of third mold pieces (C). One of the first mold piece (A) and the second mold piece (B) has a protrusion cavity surface (2f) that protrudes toward the third mold piece (C) from a mating surface (1a) to contact with the third mold piece (C) and shapes an external profile of the molded article (Ma) together with a cavity surface (3f) of the third mold piece (C) when the mold pieces are clamped with each other.

5 Claims, 3 Drawing Sheets

(51) Int. Cl.
  *B29C 33/48* (2006.01)
  *B29C 33/20* (2006.01)
  *B29C 45/26* (2006.01)
  B29K 21/00 (2006.01)
  B29K 105/24 (2006.01)
(52) U.S. Cl.
  CPC .......... *B29C 45/33* (2013.01); *B29K 2021/00* (2013.01); *B29K 2105/246* (2013.01)

(56) References Cited

U.S. PATENT DOCUMENTS

| | | | | |
|---|---|---|---|---|
| 3,373,460 A | * | 3/1968 | Ladney, Jr. ............. | B29C 33/48 249/152 |
| 3,905,740 A | * | 9/1975 | Lovejoy .................. | B29C 45/33 249/63 |
| 3,987,144 A | * | 10/1976 | Nickold .................. | B29C 45/33 264/318 |

FOREIGN PATENT DOCUMENTS

| | | | |
|---|---|---|---|
| JP | H09663 | A | 1/1997 |
| JP | H10138323 | A | 5/1998 |
| JP | 2007106043 | A | 4/2007 |
| JP | 2008262651 | A | 10/2008 |
| JP | 2010143094 | A | 7/2010 |
| JP | 2011255646 | A | 12/2011 |

OTHER PUBLICATIONS

Aug. 18, 2015, Notice of Reasons for Refusal issued by the Japan Patent Office in the corresponding Japanese Patent Application No. 2014-102303.

\* cited by examiner

MOLD AND METHOD OF PRODUCING MOLDED ARTICLE USING THE MOLD

TECHNICAL FIELD

This disclosure relates to a mold and a method of producing a molded article using the mold.

BACKGROUND

It has been known that a surface of a molded article has viscidity to some degree immediately after molding with a mold and thus causes inconvenience in demolding (removal) of the molded article from the mold. One known solution for this problem is that the mold is closes with a position of a split mold (a mating surface of the mold) being displaced from a predetermined position (e.g., see PLT 1).

CITATION LIST

Patent Literature

PLT 1: JP H09-000663 A

SUMMARY

Technical Problem

However, in market there is also a demand for an alternative mold capable of smooth removal of the molded article therefrom without deforming the molded article.

It is therefore an object of the present disclosure to provide a mold which allows smooth removal of a molded article therefrom without deforming the molded article, and a method of producing the molded article using the mold which allows smooth removal of the molded article therefrom without deforming the molded article.

Solution to Problem

According to the disclosure herein, there is provided a mold having a first mold piece, a second mold piece, and a third mold piece, the first and second mold pieces being arranged in an extending direction of an arbitrary axis with a space therebetween, at least one of the first and second mold pieces being movable in the extending direction of the axis, the third mold piece being disposed between the first and second mold pieces and capable of opening and closing in a splitting manner in a direction perpendicular to the axis, the first, second, and third mold pieces being clamped with each other to form a cavity therein for shaping an external profile of a molded article, and the first, second, and third mold pieces being opened to allow removal of the molded article, wherein one of the first and second mold pieces has a protrusion cavity surface that protrudes toward the third mold piece from a mating surface to contact with the third mold piece and shapes the external profile of the molded article together with the cavity surface of the third mold piece when the mold pieces are clamped with each other.

The mold according to the disclosure herein can reduce a contact area between the third mold piece and the molded article, so that the molded article can be smoothly removed from the mold without adhering to the mold and being deformed at the time of removal thereof.

According to the disclosure herein, there is provided a method of producing a molded article using a mold comprising:

a molding step that arranges an upper mold piece and a lower mold piece in an extending direction of a vertical axis with a space therebetween; disposes a middle mold piece between the upper and lower mold pieces so that it can open and close in a splitting manner in a direction perpendicular to the vertical axis; clamps the upper, lower, and middle mold pieces to form a cavity inside the upper, lower, and middle mold pieces; shapes an external profile of the molded article with a protrusion cavity surface providing on the upper mold piece and protruding toward the middle mold piece from a mating surface to contact with the middle mold piece together with a cavity surface of the middle mold piece; and molds the molded article in the cavity, a first mold-opening step that separates the upper and lower mold pieces from the middle mold piece after the molding step; and a second mold-opening step that splits the middle mold piece after the first mold-opening step.

The method of producing the molded article using the mold according to the disclosure herein allows smooth removal of the molded article from the mold without deforming the molded article.

Advantageous Effect

The disclosure herein may provide the mold which allows smooth removal of the molded article therefrom without deforming the molded article, and the method of producing the molded article using the mold which allows smooth removal of the molded article therefrom without deforming the molded article.

DETAILED DESCRIPTION

Figure 1A:
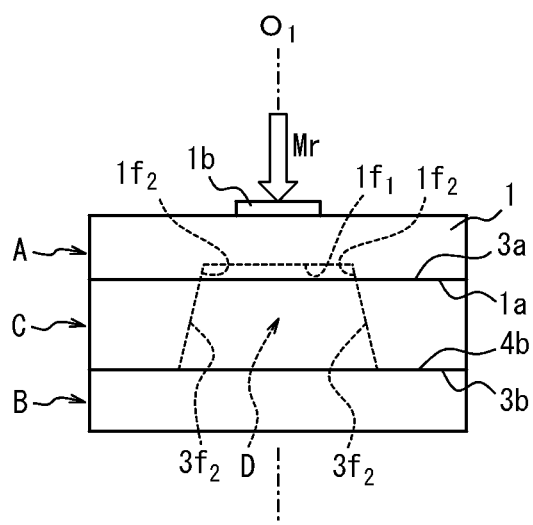
FIG. 1A is a front view schematically illustrating a mold and a molding step of a method of producing a molded article using the mold according to one embodiment of the disclosure herein.

Hereinafter, a mold and a method of producing a molded article using the mold according to one embodiment of the disclosure herein will be described in detail with reference to the drawings. The mold of the present embodiment will be described in conjunction with an injection molding apparatus for performing injection molding using unvulcanized rubber as a raw material. In the present embodiment, a molded article Ma (see FIG. 3 and FIG. 4) is, for example, a guide member to be provided on an inner periphery of a rubber crawler with/without a core metal, or a lug member to be provided on an outer periphery of the rubber crawler. Both of the members are made of unvulcanized rubber. In the following description, a vertical direction in the drawings is defined as the vertical direction, and a horizontal direction in the drawings is defined as the horizontal direction.

In FIG. 1, a reference sign A and a reference sign B refer to a first mold piece and a second mold piece, respectively, arranged in an extending direction of an arbitrary axis $O_1$ with a space therebetween. At least one of the first and second mold pieces is movable in the extending direction of the axis $O_1$. In the present embodiment, the axis $O_1$ is a vertical axis (hereinafter, also referred to as a "vertical axis $O_1$"), and a direction perpendicular to the vertical axis $O_1$ is the horizontal direction. In the present embodiment, further, the first mold piece A constitutes an upper mold piece (hereinafter, also referred to as a "upper mold piece A"), and the second mold piece B constitutes a lower mold piece (hereinafter, also referred to as a "lower mold piece B").

A reference numeral C refers to a plurality of third mold pieces disposed between the upper mold piece A and the lower mold piece B and capable of opening and closing in a splitting manner in the horizontal direction. In the present embodiment, as illustrated in FIG. 1B, the third mold piece C is composed of two split mold pieces, a split mold piece $C_1$ and a split mold piece $C_2$, which are clamped with each other to constitute a middle mold piece (hereinafter, also referred to as a "middle mold piece C"). Note that the middle mold piece C may be composed of at least two split mold pieces.

Figure 1B:
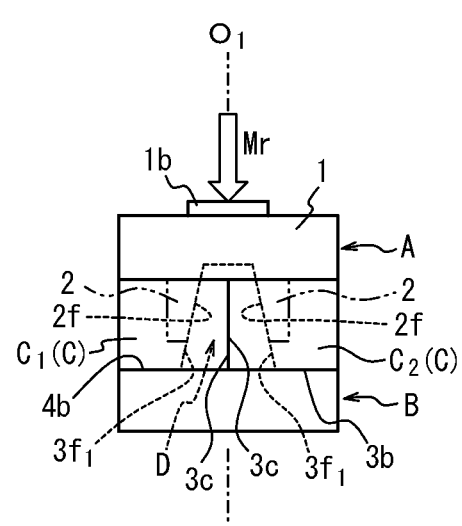
FIG. 1B is a side view schematically illustrating the step shown in FIG. 1A.

According to the mold of the present embodiment, as indicated by broken lines in FIG. 1A and FIG. 1B, for example, a cavity D is formed inside the upper mold piece A, the lower mold piece B, and the middle mold piece C to shape an external profile of the molded article Ma when the mold pieces are clamped.

Figure 5A:
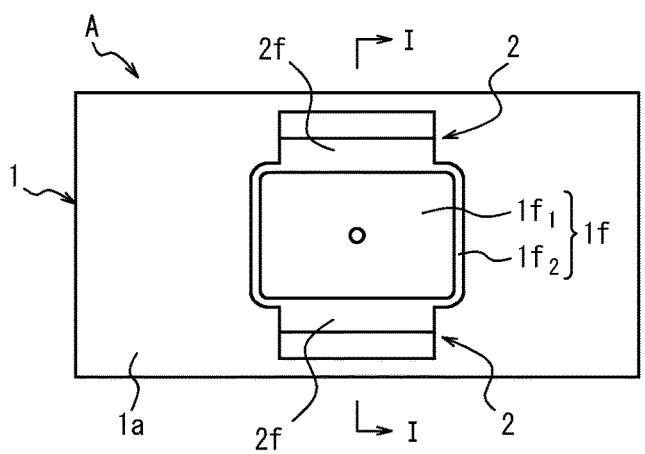
FIG. 5A is a bottom view schematically illustrating an upper mold piece of the mold of FIG. 1 viewed from a mating surface thereof for contacting with a middle mold piece.
Figure 5B:
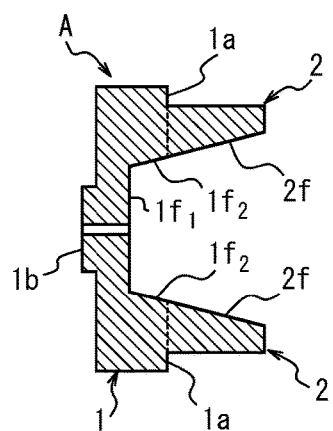
FIG. 5B is a cross-sectional view taken along the line I-I of FIG. 5A.

Further, in particular, as illustrated in FIG. 5, the upper mold piece A is composed of a main body 1 and protrusions 2. In the present embodiment, as illustrated in FIG. 5A, the main body 1 of the upper mold piece A includes a mating surface 1a in the shape of a rectangular plane to contact with the middle mold piece C. Also, the main body 1 of the upper mold piece A includes an upper cavity surface 1f in the shape of a rectangular recess formed on the mating surface 1a. In the present embodiment, the upper cavity surface 1f is composed of a bottom surface $1f_1$ in a flat rectangular shape and an edge surface $1f_2$ in a circular shape connecting with an outer periphery of the bottom surface $1f_1$. As illustrated in FIG. 5B, the edge surface $1f_2$ is an inclined surface inclined toward an outside of the main body 1 from the bottom surface $1f_1$ of the upper cavity surface 1f toward the mating surface 1a. In the present embodiment, that is, the mating surface 1a of the upper mold piece A includes a cavity in the shape of a truncated quadrangular pyramid.

The protrusion 2 includes a protrusion cavity surface 2f and protrudes from the mating surface 1a to contact with the middle mold piece C. In the present embodiment, as illustrated in FIG. 5A, the protrusions 2 are disposed in two positions facing each other in a short direction of the upper cavity surface 1f. In the present embodiment, also, the protrusion cavity surface 2f, as described below, when the upper mold piece A and the middle mold piece C are clamped, protrudes from the mating surface 1a to contact with the middle mold piece C toward the middle mold piece C and, together with a cavity surface 3f of the middle mold piece C, forms at least a portion of the external profile of the molded article Ma. In the present embodiment, further, the protrusion cavity surface 2f, as illustrated in FIG. 5B, is an inclined surface which becomes closer to the outer periphery of the mating surface 1a as positioned closer to a top of the protrusion 2. In the present embodiment, the protrusion cavity surface 2f is flush with the edge surface $1f_2$ of the upper cavity surface if formed on the main body 1.

Figure 6A:
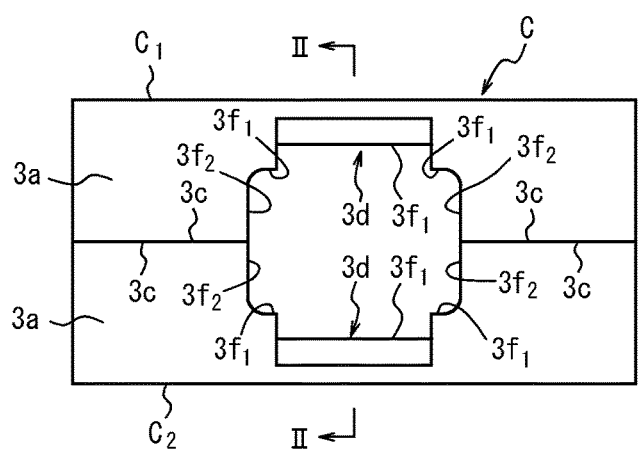
FIG. 6A is a bottom view schematically illustrating the middle mold piece of the mold of FIG. 1 viewed from a mating surface thereof for contacting with the upper mold piece.
Figure 6B:
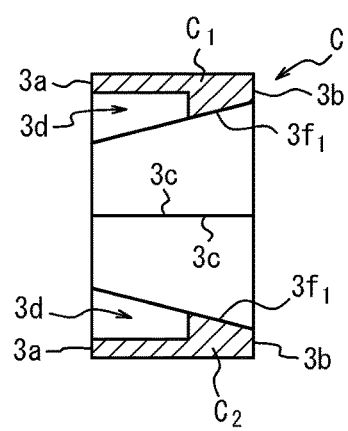
FIG. 6B is a cross-sectional view taken along the line II-II of FIG. 6A.

On the other hand, as illustrated in FIGS. 6A and 6B, the middle mold piece C is composed of the split mold piece $C_1$ and the split mold piece $C_2$. The middle mold piece C forms a portion of the cavity D at the time of mold clamping with a mating surface 3c of the split mold piece $C_1$ and a mating surface 3c of the split mold piece $C_2$ contacting with each other. As illustrated in FIG. 6A, both the split mold piece $C_1$ and the split mold piece $C_2$ include a mating surface 3a to contact with the mating surface 1a of the upper mold piece A and a mating surface 3b to contact with a mating surface 4b of the lower mold piece B. In the present embodiment, the mating surfaces 3a and 3b are formed when the mating surface 3c of the split mold piece $C_1$ and the mating surface 3c of the split mold piece $C_2$ contact with each other. Further, as illustrated in FIG. 6A, the mating surface 3c of the split mold piece $C_1$ and the mating surface 3c of the split mold piece $C_2$ have respective grooves in the shape of a cut-out formed from the mating surface 3a to contact with the upper mold piece A toward the mating surface 3b to contact with the lower mold piece B. In the present embodiment, as illustrated in FIG. 6B, the groove is basically formed by a groove bottom surface $3f_1$ inclined toward a direction opposite to the mating surface 3c from the mating surface 3a to contact with the upper mold piece A to the mating surface 3b to contact with the lower mold piece B, and two groove side surfaces $3f_2$ connected to the groove bottom surface $3f_1$. In the present embodiment, as illustrated in FIG. 1 and the like, each of the groove side surfaces $3f_2$ is inclined in such a manner that a space therebetween increases from the mating surface 3a to contact with the upper mold piece A toward the mating surface 3b to contact with the lower mold piece B. In the present embodiment, therefore, as illustrated in FIGS. 1A and 1B, when the split mold piece $C_1$ and the split mold piece $C_2$ are clamped with each other, a middle cavity surface (a third cavity surface) f is formed inside the middle mold piece C by the groove bottom surfaces $3f_1$ and the groove side surfaces $3f_2$ of the split mold pieces $C_1$ and $C_2$. The cavity formed by the middle cavity surface 3f forms a through hole in the shape of the truncated quadrangular pyramid which becomes wider from the mating surface 3a to the mating surface 3b.

The middle mold piece C of the present embodiment also includes recesses $3d$ formed by cutting out portions of the middle cavity surface $3f$. In the present embodiment, the recesses $3d$ are formed on the mating surface $3c$ of the split mold piece $C_1$ and on the mating surface $3c$ of the split mold piece $C_2$. In the present embodiment, when the upper mold piece A and the middle mold piece C are clamped with each other, each of the protrusions 2 of the upper mold piece A fits in each of the recess $3d$. Thereby, when the upper mold piece A and the middle mold piece C are clamped with each other, the protrusion cavity surface $2f$ of the upper mold piece A, together with the edge surface $1f_2$ of the upper cavity surface if formed on the upper mold piece A and the middle cavity surface $3f$ formed on the middle mold piece C, shapes the external profile of the molded article.

In the present embodiment, as illustrated in FIG. 1B, the protrusion cavity surface $2f$ of the upper mold piece A and the middle cavity surface $3f$ of the middle mold piece C form a flush surface when mold pieces are clamped. That is, in the present embodiment, the flush surface ($2f$, $3f$) formed by the protrusion cavity surface $2f$ and the middle cavity surface $3f$ is an inclined surface inclined toward a direction remote from a first axis $O_1$ from a top of the vertical axis $O_1$ to a bottom.

The lower mold piece B, as illustrated in FIGS. 1A and 1B, includes a mating surface $4b$ in the shape of a rectangular plane to contact with the middle mold piece C. The lower mold piece B is clamped by bringing the mating surface $4b$ to contact with the middle mold piece C into contact with the mating surface $3b$ of the middle mold piece C. Note that, in the present embodiment, as illustrated in FIGS. 1A and 1B, the mating surfaces $3b$ of the middle mold piece C form a flush surface when the split mold piece $C_1$ and the split mold piece $C_2$ are joined together.

Next, a method of producing the molded article using the mold according to the present embodiment will be described. The method of producing the molded article according to the present embodiment may use the mold of the embodiment of the disclosure herein described above, and the method of producing the present embodiment uses the mold described above.

The production method according to the present embodiment firstly performs a molding step illustrated in FIGS. 1A and 1B. During the molding step, the middle mold piece C composed of a plurality of split molds $C_1$ and $C_2$ capable of opening and closing in the splitting manner in the horizontal direction perpendicular to the vertical axis $O_1$ are disposed between the upper mold piece A and the lower mold piece B arranged in the extending direction of the vertical axis $O_1$ with a space therebetween. By clamping the mold pieces, the cavity D is formed inside the upper mold piece A, the lower mold piece B, and the middle mold piece C. In this state, as illustrated in FIG. 1A, the protrusion cavity surface $2f$ provided to the upper mold piece A, together with the middle cavity surface $3f$ of the middle mold piece C, partially shapes the external profile of the molded article Ma. Then, during the molding step, a raw material Mr (unvulcanized rubber in the present embodiment) is injected into the cavity D from an introduction portion $1b$ provided to the upper mold piece A. Thereby, the molded article Ma made of the raw material Mr is molded inside the cavity D.

Next, the production method according to the present embodiment performs a first mold-opening step. During the first mold-opening step which follows the molding step described above, the upper mold piece A and the lower mold piece B are separated from the middle mold piece C.

Figure 2A:
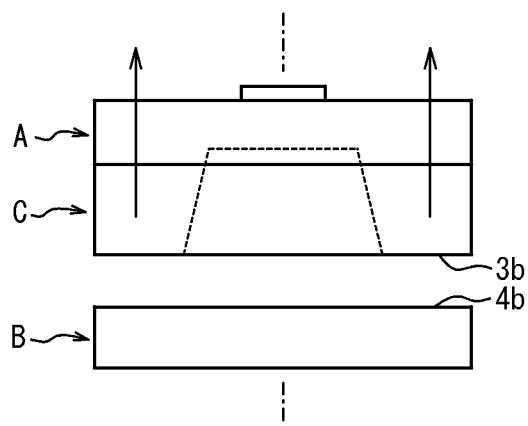
FIG. 2A is a front view schematically illustrating a first mold-opening step of the method of producing the molded article using the mold of FIG. 1.
Figure 2B:
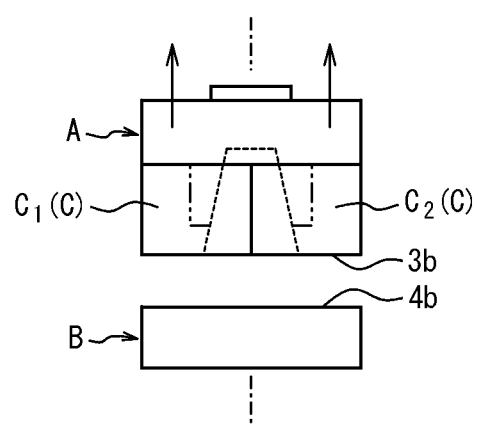
FIG. 2B is a side view schematically illustrating the step shown in FIG. 2A.

During the first mold-opening step of the production method according to the present embodiment, a step of opening the lower mold piece is firstly performed as illustrated in FIGS. 2A and 2B. During the lower mold piece opening step which follows the molding step described above, the lower mold piece B is separated while the upper mold piece A and the middle mold piece C remain clamped. In the present embodiment, the upper mold piece A and the middle mold piece C remain clamped and are displaced upward in the vertical axis $O_1$ to be separated from the lower mold piece B. In the present embodiment, after the lower mold piece B is separated, the middle mold piece C, together with the upper mold piece A, is horizontally displaced to above a storage unit (e.g., a basket) for the molded article Ma.

Figure 3A:
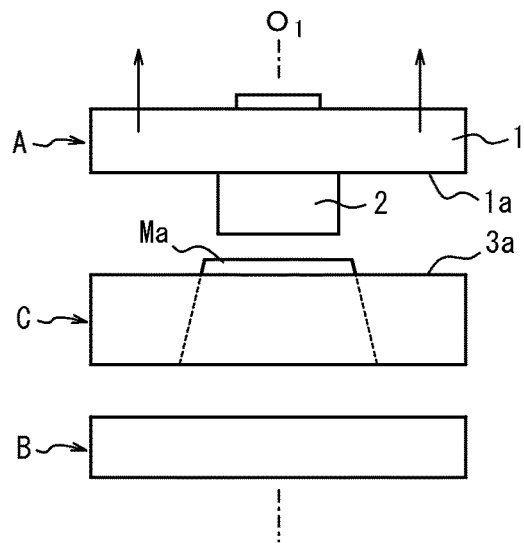
FIG. 3A is a front view schematically illustrating the first mold-opening step of the method of producing the molded article using the mold of FIG. 1.
Figure 3B:
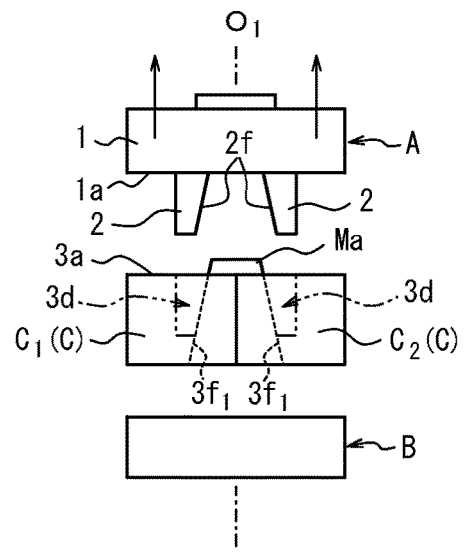
FIG. 3B is a side view schematically illustrating the step shown in FIG. 3A.

During the first mold-opening step of the present embodiment, as illustrated in FIGS. 3A and 3B, a step of opening the upper mold piece is then performed. During the upper mold piece opening step which follows the lower mold piece opening step, the upper mold piece A is separated from the middle mold piece C. In the present embodiment, the upper mold piece A is displaced upward in the vertical axis $O_1$ to be separated from the middle mold piece C. In the present embodiment, the upper mold piece A having been separated from the middle mold piece C is horizontally displaced to another position.

Figure 4A:
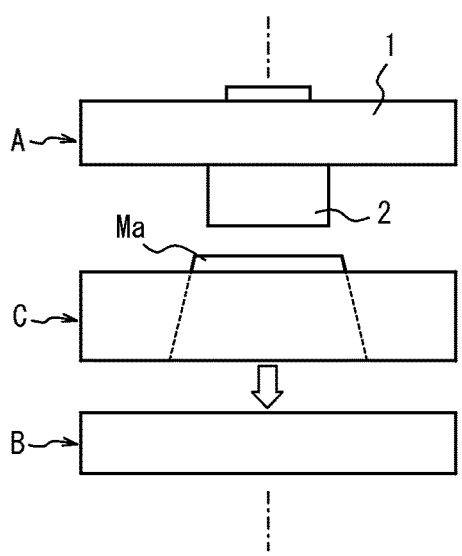
FIG. 4A is a front view schematically illustrating a second mold-opening step of the method of producing the molded article using the mold of FIG. 1.
Figure 4B:
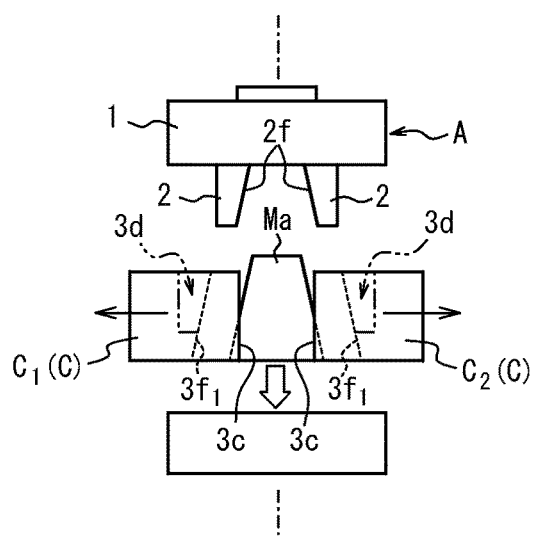
FIG. 4B is a side view schematically illustrating the step shown in FIG. 4A.

In the production method according to the present embodiment, as illustrated in FIGS. 4A and 4B, a step of opening the middle mold piece (a second mold-opening step) is further performed. During the middle mold piece opening step which follows the first mold-opening step, the middle mold piece C is split into the split mold piece $C_1$ and the split mold piece $C_2$, and thus the molded article Ma is ejected therefrom. In the present embodiment, the split mold pieces $C_1$ and $C_2$ may be displaced in the horizontal direction to be separated from each other.

In the present embodiment, as illustrated in FIG. 3B, when the upper mold piece A is separated from the middle mold piece C, the middle cavity surface $3f$ (the groove bottom surface $3f_1$ and the groove side surface $3f_2$) alone of the middle mold piece C is in contact with the molded article Ma, and thus a contact area between the middle mold piece C and the molded article Ma is reduced. Therefore, the molded article Ma having viscosity immediately after the molding is prevented from tightly adhering to the middle mold piece C. Accordingly, even when an ejector (a pressing member) is moved down from above the molded article Ma and pushes out the molded article Ma after the split mold piece $C_1$ and the split mold piece $C_2$ of the middle mold piece C are separated from each other, the molded article Ma does not get caught by the middle mold piece C. As a result, the molded article Ma may be removed from the mold pieces A-C without being deformed. In the present embodiment, the molded article Ma removed from the mold pieces A-C is dropped into the storage unit and stored therein.

In addition, according to the present embodiment, the cavity surfaces $3f$ of the split molds $C_1$ and $C_2$ do not tightly adhere to the molded article Ma, so that the molded article Ma may be prevented from tightly adhering to one of the split mold piece $C_1$ and the split mold piece $C_2$ and being stretched and deformed when the split mold pieces $C_1$ and $C_2$ are separated in the horizontal direction.

Further, when at least the middle cavity surface $3f$ is subjected to a surface treatment for preventing adhesion, simply splitting the middle mold piece C into the split molds $C_1$ and $C_2$ allows removal of the molded article Ma from the middle mold piece C. That is, the mold of the present embodiment allows smooth removal of the molded article Ma therefrom.

In the present embodiment, the protrusion cavity surface 2f of the upper mold piece A and the cavity surface 3f of the middle mold piece C also forms a flush surface when the mold pieces are clamped with each other. In this case, the molded article Ma may be more smoothly removed from the middle mold piece C.

In the present embodiment, the flush surface (2f and 3f) described above is the inclined surface inclining toward the direction remote from the vertical axis $O_1$ from the top of the extending direction of the vertical axis $O_1$ to the bottom thereof. In this case also, the molded article Ma may be more smoothly removed from the middle mold piece C.

In the present embodiment, the protrusion cavity surface 2f of the upper mold piece A is further formed on the protrusion 2 and fits in the recess 3d formed by cutting out the middle cavity surface 3f of the middle mold piece C. In this case, positioning of each mold piece may be performed upon clamping the mold pieces with each other, and therefore deformation of the molded article Ma due to displacement of the mold pieces may be prevented. Accordingly, the molded article Ma may be more smoothly removed. Also, as compared to a mold without the protrusion 2, the weight of the upper mold piece A may be reduced.

As described above, the method of producing the molded article according to the present embodiment allows smooth removal of the molded article Ma from the mold.

Therefore, according to the present embodiment of the disclosure herein, the mold which allows smooth removal of the molded article Ma therefrom, and the production method using the mold which allows smooth removal of the molded article Ma therefrom may be provided.

The description set forth above is one mere embodiment of the disclosure herein and may be changed in a variety of manners within the scope of the claims. For example, the protrusion 2 having the protrusion cavity surface 2f may be provided to the lower mold piece B. Also, the upper mold piece A and the lower mold piece B are not limited to be arranged in the extending direction of the vertical axis $O_1$ with a space therebetween but may be arranged in the horizontal direction. That is, the first mold piece and the second mold piece of the disclosure herein may be arranged in an extending direction of an arbitrary axis with a space therebetween, and at least one of the first mold piece and the second mold piece needs to be movable in the extending direction of the axis.

INDUSTRIAL APPLICABILITY

The disclosure herein is applicable to a mold including a first mold piece, a second mold piece, and a third mold piece with a cavity formed therein to shape an external profile of a molded article when the mold pieces are clamped with each other and allowing, when the first to third mold pieces are opened, release of tight contact of the molded article with each mold piece and removal of the molded article therefrom, and also applicable to the method of producing the molded article using the mold.

REFERENCE SIGNS LIST

1: main body, 2: protrusion, 2f: protrusion cavity surface, 3d: recess, 3f: middle cavity surface (third mold piece cavity surface), A: upper mold piece (first mold piece), B: lower mold piece (second mold piece), C: middle mold piece (third mold piece), D: cavity, Ma: molded article, Mr: raw material

The invention claimed is:

1. A mold for molding unvulcanized rubber having a first mold piece, a second mold piece, and a third mold piece, the first and second mold pieces being arranged in an extending direction of an arbitrary axis with a space therebetween, at least one of the first and second mold pieces being movable in the extending direction of the axis, the third mold piece being disposed between the first and second mold pieces and capable of opening and closing in a splitting manner in a direction perpendicular to the axis, the first, second, and third mold pieces being clamped with each other to form a cavity therein for shaping an external profile of a molded article made of unvulcanized rubber, and the first, second, and third mold pieces being opened to allow removal of the molded article, wherein one of the first and second mold pieces has a protrusion cavity surface that protrudes toward the third mold piece from a mating surface to contact with the third mold piece and shapes the external profile of the molded article together with the cavity surface of the third mold piece when the mold pieces are clamped with each other, and in a section passing through the protrusion cavity surface and being perpendicular to the axis when the first, second, and third mold pieces are clamped with each other, a profile line defining an outer edge of the cavity is composed at least of the protrusion cavity surface and the cavity surface of the third mold piece.

2. The mold according to claim 1, wherein in the section passing through the protrusion cavity surface and being perpendicular to the axis when the first, second, and third mold pieces are clamped with each other, the protrusion cavity surface is disposed at either side in a direction that split mold pieces constituting the third mold piece are opened in a split manner with a plane including mating surfaces of the split mold pieces being as a center.

3. The mold according to claim 1, wherein the protrusion cavity surface and the cavity surface of the third mold piece form a flush surface when the mold pieces are clamped with each other.

4. The mold according to claim 3, wherein the flush surface is an inclined surface inclining toward a direction remote from the axis from one end of the extending direction of the axis to the other.

5. The mold according to claim 1, wherein the protrusion cavity surface is formed on a protrusion to fit in a recess formed by cutting out the cavity surface of the third mold piece.

* * * * *